US011536966B2

(12) United States Patent
Amirsolaimani et al.

(10) Patent No.: US 11,536,966 B2
(45) Date of Patent: Dec. 27, 2022

(54) DISPLAY WITH A COMPACT BEAM SCANNER

(71) Applicant: Facebook Technologies, LLC, Menlo Park, CA (US)

(72) Inventors: Babak Amirsolaimani, Redmond, WA (US); Brian Wheelwright, Sammamish, WA (US); Daniel Guenther Greif, Redmond, WA (US); Weichuan Gao, Redmond, WA (US); Miaomiao Xu, Redmond, WA (US); Jacques Gollier, Bellevue, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 240 days.

(21) Appl. No.: 17/081,272

(22) Filed: Oct. 27, 2020

(65) Prior Publication Data
US 2022/0050292 A1   Feb. 17, 2022

Related U.S. Application Data

(60) Provisional application No. 63/066,592, filed on Aug. 17, 2020.

(51) Int. Cl.
*G02B 27/01* (2006.01)
*G02B 26/08* (2006.01)
(Continued)

(52) U.S. Cl.
CPC ....... *G02B 27/0172* (2013.01); *G02B 5/3066* (2013.01); *G02B 26/0833* (2013.01);
(Continued)

(58) Field of Classification Search
CPC ............. G02B 27/0172; G02B 5/3066; G02B 26/0833
(Continued)

(56) References Cited

U.S. PATENT DOCUMENTS 6,700,552 B2   3/2004   Kollin et al.
7,232,071 B2   6/2007   Lewis et al.
(Continued)

OTHER PUBLICATIONS

International Search Report and Written Opinion for International Application No. PCT/US2021/046093, dated Nov. 26, 2021, 12 pages.
(Continued)

*Primary Examiner* — Collin X Beatty
*Assistant Examiner* — Grant A Gagnon
(74) *Attorney, Agent, or Firm* — Pequignot + Myers; Matthew A. Pequignot

(57) ABSTRACT

A display device includes a relay waveguide and a scanner. The scanner is configured to angularly scan image light for coupling into the waveguide, and includes a scanning reflector and a second reflector disposed between the scanning reflector and an input coupler of the waveguide. The scanning reflector has an aperture for the image light to propagate therethrough toward the second reflector. The second reflector is configured to reflect at least a portion of the image light received through the aperture back toward the scanning reflector and to transmit at least a portion of the image light reflected from the scanning reflector toward the input coupler. The arrangement enables a compact design of the display.

20 Claims, 17 Drawing Sheets

(51) Int. Cl.
*G02B 27/30* (2006.01)
*G02B 5/30* (2006.01)

(52) U.S. Cl.
CPC ......... *G02B 27/0179* (2013.01); *G02B 27/30* (2013.01); *G02B 2027/013* (2013.01); *G02B 2027/0187* (2013.01)

(58) Field of Classification Search
USPC .......................................................... 359/630
See application file for complete search history.

(56) References Cited

U.S. PATENT DOCUMENTS

| | | | |
|---|---|---|---|
| 7,558,455 | B2 | 7/2009 | Weir et al. |
| 10,056,020 | B2 | 8/2018 | Chi et al. |
| 10,168,537 | B1 | 1/2019 | Parsons |
| 2008/0073163 | A1 | 3/2008 | Wier et al. |
| 2010/0079865 | A1 | 4/2010 | Saarikko et al. |
| 2010/0201953 | A1 | 8/2010 | Freeman et al. |
| 2011/0134017 | A1 | 6/2011 | Burke |
| 2014/0268174 | A1 | 9/2014 | Sabry et al. |
| 2018/0052325 | A1 | 2/2018 | Bohn |
| 2018/0082644 | A1 | 3/2018 | Bohn |
| 2018/0120559 | A1 | 5/2018 | Yeoh et al. |
| 2019/0235252 | A1 | 8/2019 | Freedman et al. |

OTHER PUBLICATIONS

Nakao A., et al., "Integrated Waveguide-Type Red-Green-Blue Beam Combiners for Compact Projection-Type Displays," Optics Communications, May 23, 2014, vol. 330, pp. 45-48.

Piggott A.Y., et al., "Inverse Design and Demonstration of a Compact and Broadband On-Chip Wavelength Demultiplexer," Physics Optics, Apr. 1, 2015, 15 pages.

Yoshida T., et al., "Polarization-Insensitive Vertically Curved Si Surface Optical Coupler Bent by Ion Implantation," IEEE Photonics Technology Letters, Oct. 15, 2020, vol. 32 (20), pp. 1319-1322.

Yu S., et al., "Integrated Quadratic Reflectors for High-Performance Optical Interconnects," 2020 IEEE Photonics Conference, Sep. 28, 2020, 2 pages, Retrieved from the Internet: URL: https://ieeexplore.ieee.org/document/9252220.

DISPLAY WITH A COMPACT BEAM SCANNER

REFERENCE TO RELATED APPLICATION

This application claims priority from U.S. Provisional Application No. 63/066,592, filed on Aug. 17, 2020, entitled "Compact Beam Scanner" and incorporated herein by reference in its entirety.

TECHNICAL FIELD

The present disclosure relates to wearable headsets, and in particular to components and modules for wearable visual display headsets.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays provide images in angular domain, which can be observed by a user's eye directly, without an intermediate screen or a display panel. A pupil-replicating waveguide is used to carry the image in angular domain to the user's eye. The lack of a screen or a display panel in a scanning projector display enables size and weight reduction of the display. The image may be obtained by scanning a light beam over the field of view (FOV) of the display.

BRIEF DESCRIPTION OF THE DRAWINGS

Example embodiments will now be described in conjunction with the drawings, which are not to scale, in which like elements are indicated with like reference numerals, and in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Reference throughout this specification to "one embodiment" or "an embodiment" means that a particular feature, structures, or characteristics may be combined in any suitable manner in one or more embodiments.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A scanning projector display requires an optical scanner, which is typically based on a tiltable reflector. The scanner may be capable of scanning a light beam over the entire field of view (FOV) of the display. The FOV may be understood as a solid angle in which image light may be provided to a viewer. As the light beam is scanned, its brightness and/or color may vary in coordination with the scanning, to provide an image in angular domain. The light beam may be scanned in two directions, e.g. over X- and Y-viewing angles. When the frame rate is high enough, the eye integrates the scanned light beam, enabling the user to see the displayed imagery substantially without flicker. A relay waveguide may be provided to relay the image in angular domain to an eyebox of the display. A relay waveguide configured to provide pupil replication may also be referred to as a pupil replicating waveguide.

Figure 1A:
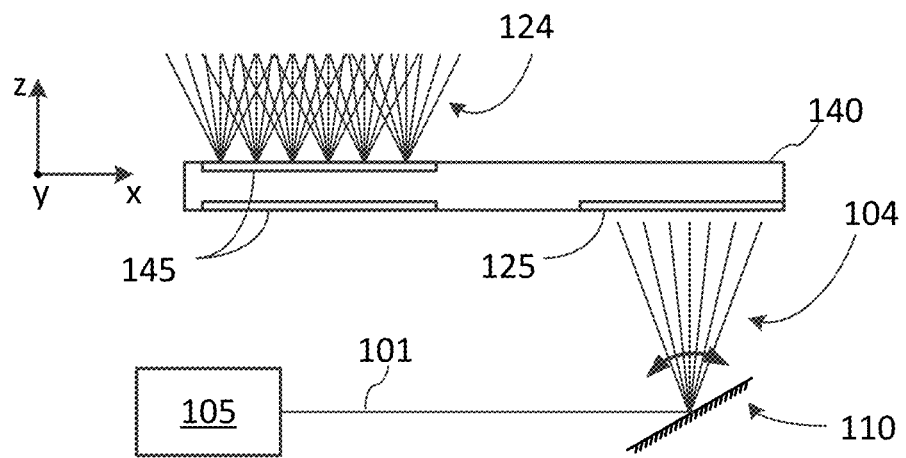
FIG. 1A is a schematic diagram of a scanning projector display with a slanted scanning mirror for beam redirection.
Figure 1B:
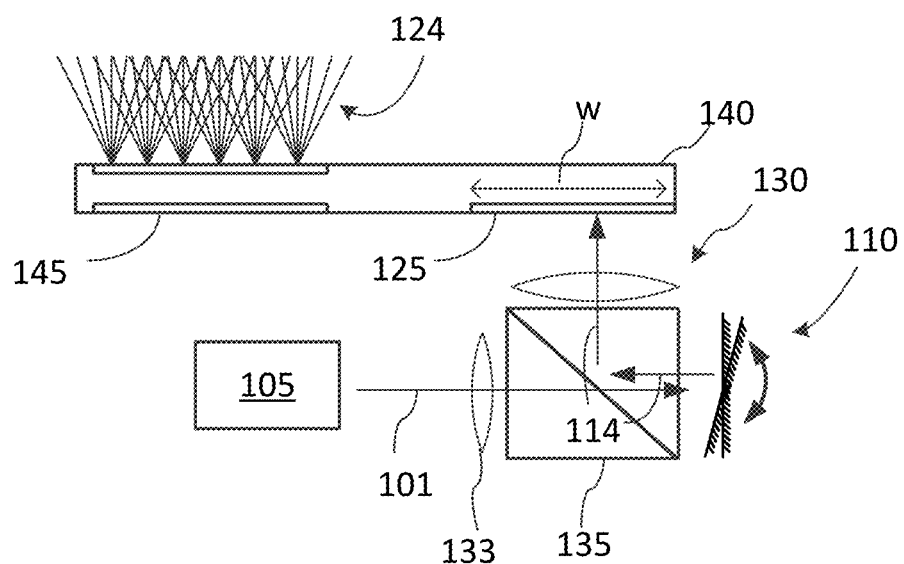
FIG. 1B is a schematic diagram of a scanning projector display with beam redirection optics between a scanning mirror and a relay waveguide.

One challenge associated with some image scanners is a reduction of the FOV caused by an oblique angle of incidence of the light beam onto a slanted tiltable reflector of the scanner, for example as illustrated in FIG. 1A. The oblique angle may be required by the optical geometry used, e.g. to physically separate an impinging light beam from the scanned, i.e. reflected, light beam. The FOV reduction is caused by distortion of the solid angle representing the range of scanning at oblique angles of incidence of light beam at the tiltable reflector. Some image scanners mediate this challenge by using beam routing optics between the tiltable reflector and the waveguide, for example as schematically illustrated in FIG. 1B. This, however, may increase the size of the scanner, lengthen the optical path of the scanned beam to an input coupler of the pupil replicating waveguide, and increase the surface area requirements of the input coupler for a given FOV.

The present disclosure relates to a beam scanning method, in which a divergent beam is sent toward a back reflector through an opening in a scanning reflector, to obtain a reflected light beam propagating toward the scanning reflector. The reflected light beam is reflected by the scanning reflector through the back reflector. The scanning reflector is operated to angularly scan the reflected light beam along at least one direction. The back reflector may be curved to collimate the reflected light beam to produce a collimated scanned beam. The collimated scanned beam may be coupled into a pupil replicator such as a relay waveguide at an angle variable by scanning the scanning reflector.

The present disclosure further relates to a beam scanner comprising a scanning reflector having an opening, and a back reflector disposed to reflect light transmitted through the opening back toward the scanning reflector as an expanded, for example collimated, beam. In some embodiments the opening may be simply a hole through the scanning reflector. In some embodiments the opening may be in the form of a see-through window that is at least partially transparent. In some embodiments the opening may comprise a polarizer.

An aspect of the present disclosure provides a display device that comprises a pupil replicating waveguide comprising an input coupler, and a beam scanner configured to angularly scan image light for coupling into the pupil replicating waveguide. The beam scanner may comprise a scanning reflector, and a second reflector disposed between the scanning reflector and the input coupler. The scanning reflector may have an aperture for allowing the image light to propagate therethrough toward the second reflector. The second reflector may be configured to reflect at least a portion of the image light received through the aperture back toward the scanning reflector, and to transmit at least a portion of the image light reflected from the scanning reflector toward the input coupler.

In some implementations, the scanning reflector may comprise a tiltable reflector such as tiltable mirror. In some implementations the scanning reflector may comprise a MEMS reflector. In some implementations the aperture may be in a center of the scanning reflector. In some implementations the aperture may have tapered edges. In some implementations the aperture may have a rectangular shape. In some implementations the aperture may have a circular shape.

In some implementations, the second reflector may be configured to at least partially collimate the image light beam reflected therefrom. In some implementations the second reflector may comprise a curved reflective surface. In some implementations the second reflector may be stationary. In any of these or other implementations the second reflector may comprise a reflective polarizer. In some implementations the display device may comprise a quarter-wave plate (QWP) disposed between the reflective polarizer and the scanning reflector.

In any of the above or other implementations, the display device may further comprise a light source configured to emit the image light. In some implementations the light source may comprise a plurality of emitters for emitting the image light comprising a plurality of image light beams.

In any of the above or other implementations, the display device may comprise focusing optics configured to focus the image light through the aperture. In any of the above or other implementations the display device may comprise aberration correcting optics upstream of the scanning reflector and configured to pre-compensate for aberrations related to off-axis light propagation. In any of the above or other implementations the display device may comprise at least one of relay optics upstream of the scanning reflector or folded optics upstream of the scanning reflector.

In any of the above or other implementations, the display device may comprise a photonic integrated circuit (PIC) configured to direct the image light into the aperture. In any of the above or other implementations the display device may comprise a MEMS reflector. In any of the above implementations the display device may comprise a substrate supporting a MEMS reflector and a PIC configured to direct the image light into the aperture.

An aspect of the disclosure provides a method for coupling an image light beam from a scanning reflector into a pupil replicating waveguide of a scanning display. The method may comprise: directing a divergent light beam through an aperture in the scanning reflector toward a second reflector disposed between the scanning reflector and an input coupler of the pupil replicating waveguide to obtain a reflected light beam propagating back toward the scanning reflector; reflecting the reflected light beam by the scanning reflector for at least partially transmitting through the second reflector as the image light beam; and operating the scanning reflector to angularly scan the reflected light beam. In some implementations of the method, the second reflector may be configured to reflect incident light of a first polarization and to transmit incident light of a second polarization, and the method may comprise changing a polarization state of the light beam from the first polarization at a first incidence upon the second reflector to the second polarization at a second incidence upon the second reflector.

An aspect of the disclosure provides a display device comprising: a pupil replicating waveguide having an input pupil; and, a beam scanner configured to scan image light across the input pupil. The beam scanner may comprise a scanning reflector comprising an aperture for allowing the image light to pass through the scanning reflector, and a second reflector disposed between the scanning reflector and the input pupil. The second reflector may be configured to reflect at least a portion of the image light received from the aperture toward the scanning reflector, and to transmit at least a portion of the image light reflected from the scanning reflector toward the input pupil.

Referring to FIG. 1A, a scanning projector display may include a light source 105 that is operable to provide a light beam 101. A scanner 110, e.g. a microelectromechanical system (MEMS) including a tiltable reflector, is optically coupled to the light source 105 for scanning the light beam 101 in two dimensions, e.g. about an X-axis and/or Y-axis perpendicular to the X-axis, to provide a scanned beam 104. The X- and Y-axes may be disposed in plane of the MEMS reflector at its normal i.e. unpowered position; in FIG. 1A the Y-axis is normal to the plane of the figure. Pre-tilted MEMS reflectors may also be used. A pupil replicating waveguide 140, which includes an input coupler 125 and output couplers 145, provides image light 124 including multiple laterally displaced parallel copies of the scanned light beam 104.

The light source 105 may be based on a solid-state single-mode or multimode light source such as a light-emitting diode (LED), a superluminescent light-emitting diode (SLED), a side-emitting laser diode, a vertical-cavity surface-emitting laser diode (VCSEL), etc. In operation, the light source 105 may provide image light carrying image information. The scanner 110 angularly scans the light beam 104 through a succession of directions in coordination with the light source 105 changing the optical power level of the light beam 101, to form an image in angular domain.

The pupil replicating waveguide 140 provides multiple laterally displaced parallel copies of the scanned light beam 104 as it is scanned by the scanner 110 through a sequence of directions. A viewer's eye (not shown) receives a portion of the image light 124, and forms an image at the eye's retina from the corresponding replicated light beams at various angles. In this manner, the eye forms a spatial image on the eye's retina from the image in the angular domain carried by the image light 124. The scanning may be performed faster than the integration time of the eye, and the eye may perceive a continuous, non-flickering image.

A drawback of the display configuration of FIG. 1A is the oblique incidence of the light beam 101 on the scanner 110, which may distort the FOV, and may limit how close to the waveguide the scanner 110 may be disposed. Furthermore, since the reflector needs to be slanted with oblique incidence, it creates a large gap between the reflector and the input coupler, and the overall size of the projector becomes larger. The input coupler has to be larger to support the scan range of the mirror with this larger gap.

FIG. 1B illustrates a modified scanning projector display with additional routing optics 130, which is configured to couple the scanner 110 to the light source 105 and the input coupler 125 of waveguide 140 so as to provide on-axis incidence of the light beam 101 upon scanner 110 in its non-tilted position. In the illustrated embodiment the additional routing optics 130 includes a PBS 135, one or more lenses 133, and may further include one or more QWPs (not shown), and is configured so that the light beam 101 on its first pass propagates through PBS 135, reflects from the scanner 110, and then is redirected by the polarization properties of the PBS toward the input coupler 125 of waveguide 140.

The presence of the additional routing optics 130 in the configuration of FIG. 1B increases the path length of the scanned beam from scanner 110 to waveguide 140, increasing the size w of the input coupler 125 needed to support the same FOV, and generally increasing the size to the overall setup. Furthermore, light coupled into the waveguide by a large input grating may impinge on the input grating several times as it propagates by total internal reflection (TIR) inside the waveguide, causing power loss and brightness loss and worsening a modulation transfer function (MTF) of the image being displayed to the user.

Figure 2A:
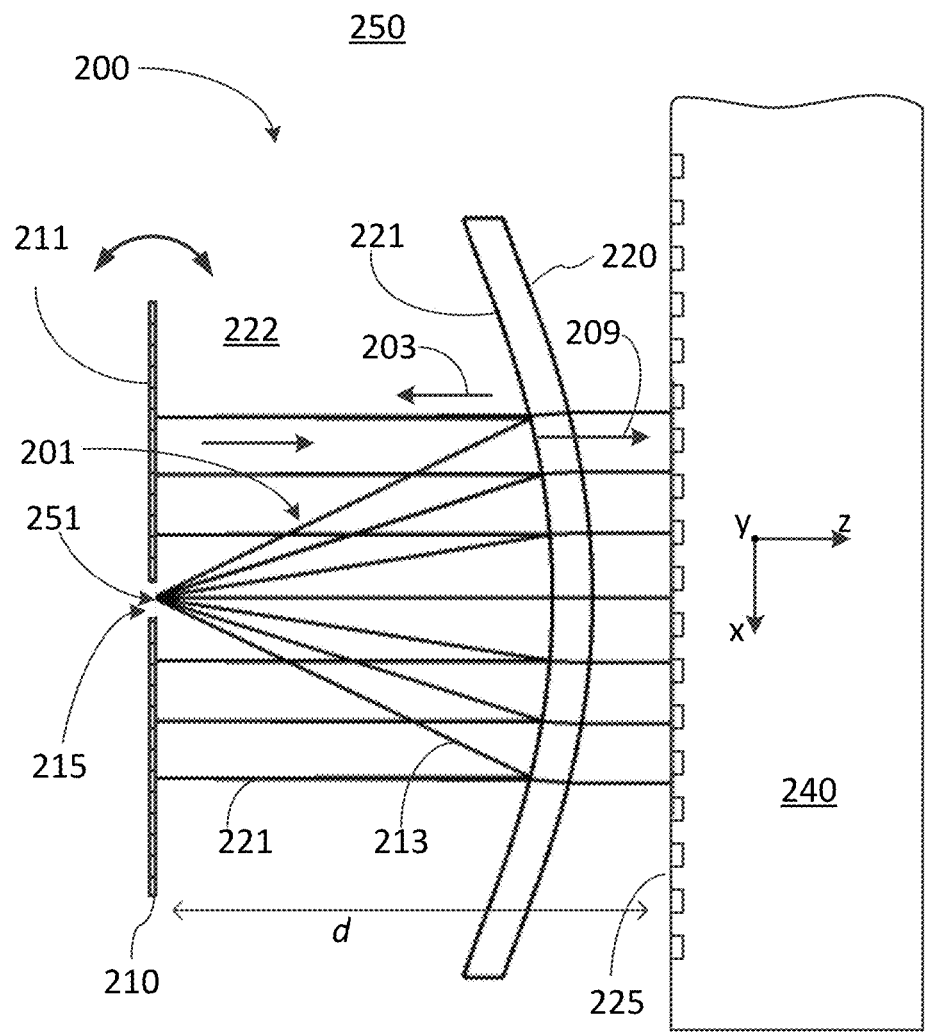
FIG. 2A is a schematic cross-sectional side view of a beam-scanning back end of an example display device showing a folded beam scanner coupling image light into a relay waveguide.
Figure 2B:
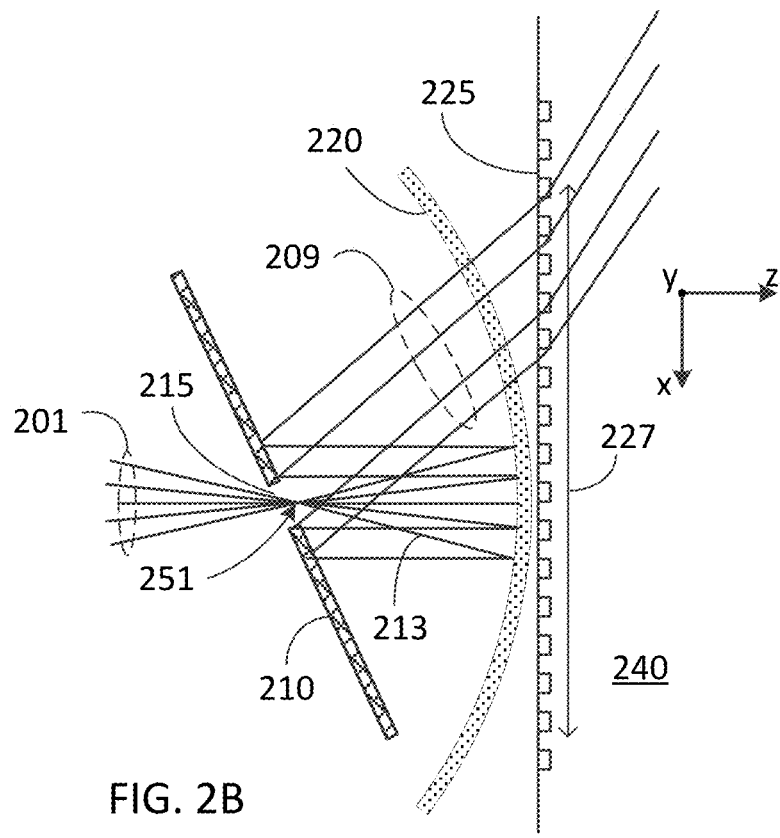
FIG. 2B is a schematic cross-sectional side view of the beam-scanning back end of the example display device of FIG. 2A with a tilted scanning reflector.

FIGS. 2A and 2B illustrate a back-end portion of an example display device 250 that uses a folded beam scanner 200 to couple image light into a relay waveguide 240 of the display. The relay waveguide 240 includes an input coupler 225, and may represent for example the pupil replicating waveguide 140 described above, or a variation thereof, and may be referred to herein simply as waveguide 240. The input coupler 225 may be as described above with reference to input coupler 125, and may be embodied with one or more diffraction gratings as an example. The folded beam scanner 200, which may also be referred to simply as scanner 200, may obviate some of the drawbacks of the configurations of FIGS. 1A and 1B. Advantageously, it may enable normal incidence upon a scanning reflector in a relatively small footprint. Scanner 200 includes a scanning reflector (SR) 210 having an aperture 215, and a back reflector (BR) 220 facing SR 210. The back reflector (BR) 220 may also be referred to as the second reflector. The aperture 215 allows input image light 201 to be directed onto BR 220 from a back side 211 of SR 210, and may be simply a hole or an opening in the SR 210. Aperture 215 may also be a transparent window; for example in some embodiments the reflecting face of SR 210 may include a transparent waveplate (not shown), e.g. a quarter-wave plate (QWP), or have it attached thereto, which may extend over or through the aperture 215. BR 220 may be configured to reflect the image light transmitted through the aperture 215 back toward SR 210. The image light 201 may travel in a cavity 222 between SR 210 and BR 220 at least twice, passing through BR 220 at a second incidence thereon. In some embodiments, cavity 222 may include a wave plate (not shown), such as a QWP.

BR 220 may be disposed adjacent to an input coupler 225 of the relay waveguide 240, so that light transmitted through BR 220 may be coupled into waveguide 240. In some embodiments BR 220 may be disposed to reflect input image light 201 in a direction normal to a light input face of waveguide 240. In some embodiments BR 220 may be close to, or even in contact with, the light input face of waveguide 240. In some embodiments BR 220 may be partially transparent. In some embodiments BR 220 may include a polarizing reflector configured to reflect light of a first polarization state PS1 and to allow light of a second, orthogonal polarization state PS2 be transmitted through it. In some embodiments BR 220 may have optical power and may at least partially focus or at least partially collimate light reflected therefrom. In some embodiments BR 220 may be a concave reflector, for example may have a concave reflecting face 221. In some embodiment BR 220 may be a parabolic reflector. In some embodiments, a collimating lens element (not shown) may be disposed between the input coupler 225 and the reflective face 221 of BR 2120.

Advantageously, BR 220 may be disposed suitably close to SR 210, so that the distance d between SR 210 and waveguide 240, or input coupler 225, is small. This distance may depend on the size of scanner 200 in the direction of input light propagation, which may in turn depend on the size of SR 210, packaging, and the tilt angle range if SR is tiltable. The small SR-BR distance allows for a correspondingly small distance between SR 210 and the input coupler 225 of waveguide 240. By way of example, SR 210 may be as close as 1 mm or less to waveguide 240, or as close as 0.3 mm away from it.

In operation, image light 201 enters cavity 222 through the aperture 215, and propagates toward BR 220 as a divergent light beam 213. BR 220 reflects the image light back toward SR 210 as a reflected beam 203, and is then reflected from SR 210 toward the input coupler 215 as a scanned beam 209, impinging upon the input coupler 225 after transmitting through BR 220. Beam 203 illuminates an area of SR 210 that is much greater than the area of aperture 215, and is reflected from SR 210 toward BR 220 and the input coupler 225 as a scanned beam 209. In some embodiments beam 209 is collimated. In some embodiments beams 203 and 209 are collimated. BR 220 may be configured to transmit at least a portion of the scanned beam 209 for coupling into waveguide 240 via the input coupler 225.

SR 210 may be operable to scan the scanned beam 209 in the angular domain in a 1D or 2D angular range. In the embodiment illustrated in FIGS. 2A and 2B, SR 210 is a tilting reflector that is tiltable about a tilt axis that is normal to the plane of the figures, i.e. parallel to the Y-axis. In some embodiments SR 210 may further be operable to tilt about a second axis that is parallel to the X-axis. The tilt axis or axes may extend through the aperture 215, for example through a center thereof, so that the position of the aperture does not change with tilt.

FIG. 2A illustrates a state of SR 210 in which it receives reflected image beam 203 at normal incidence, and returns the scanned beam 209 back along the same path. This state of SR 210 may be referred to as non-tilted, and in some embodiments may be a default state of SR 210 when SR 210 is not powered. This state of SR 210 may correspond to a normal incidence of the scanned beam 209 upon the input coupler 245. In some embodiments the angular scan range of SR 210 may be symmetrical relative to this state. In some embodiments the angular scan range of SR 210 may be asymmetrical about this state. Embodiments in which the direction of propagation of the input image light 201 is not normal to waveguide 240 may also be envisioned and are within the scope of the present disclosure.

In some embodiments the input image light 201 may be focused to have a beam waist 251 (FIG. 2B) located in the aperture 215, for example in a middle portion thereof. Having the beam waist located within the aperture may allow the aperture 215 to be suitably small, for example in the range of 50 to 250 microns across. Apertures of a size outside of this range are also within the scope of this disclosure. Generally, aperture 215 may have an area that is a small fraction of a total light-reflecting area of SR 210, for example in the range of 20% to 0.001%. Embodiments in which the beam waist 251 of the input image light 201 is located outside of aperture 215, for example somewhat inside cavity 222 or somewhat upstream of SR 210, are also within the scope of the present disclosure. In some embodiments BR 220 may have a principal focus within the aperture 215 or adjacent thereto. In some embodiments BR 220 may have a principal focus at or near the location of beam waist 251 of the input image light 201.

With reference to FIG. 2B, SR 210 may be tilted to scan the scanned beam 209 in the angular domain, and along a length of the input coupler 225. An area of the input coupler 225 that in operation may receive the scanned beam 209 may form an input pupil 227 of waveguide 204. Tilting SR 210 may therefore scan the scanned beam 209 across the input pupil 227 of waveguide 240. Here "across" may encompass partially across. In some embodiments SR 210 may further be operable to tilt about a second tilt axis that is parallel to the X-axis, to angularly scan the scanned beam 209 in a plane (y,z) normal to the plane of the figure (X,Z), and in a direction of the coupler's width.

Figure 2C:
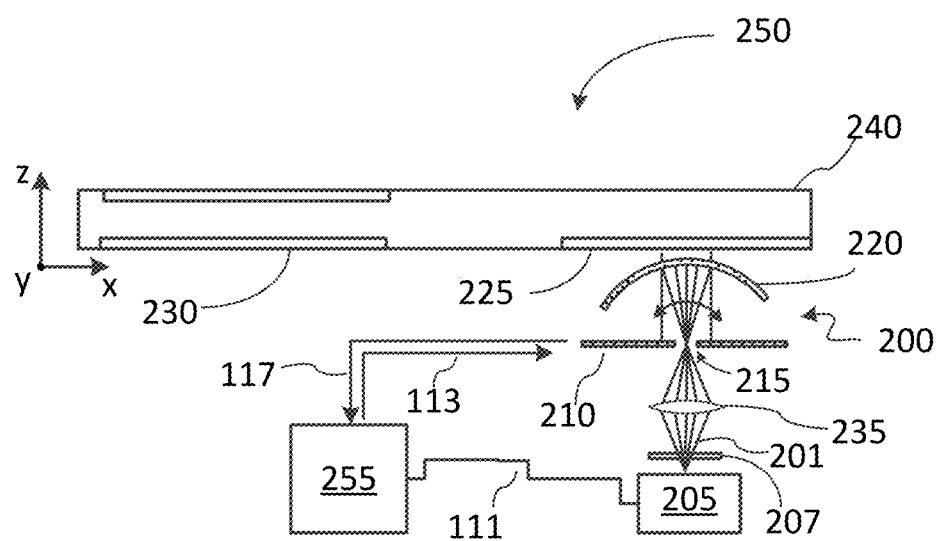
FIG. 2C is a schematic diagram of an example scanning projector display using the folded beam scanner of FIGS. 2A and 2B.

Referring now also to FIG. 2C, it illustrates an example embodiment of a display device 250 that may include a light source 205, a controller 255, a focusing optics 235, and an optional polarizer 207. In some embodiments polarizer 207 may be a circular polarizer. In some embodiments polarizer 207 may be included in the light source 205. In embodiments employing sources of linearly polarized light, a QWP upstream of SR 210 may be used as the circular polarizer 207. In embodiments employing sources of unpolarized light, the circular polarizer 207 may be embodied using a linear polarizer followed by a QWP disposed upstream of SR 210, or any other suitable circular polarizer may be used.

The light source 205 is configured to provide the input image light 201. The light source 205 may include one or more emitters. In some embodiments these emitters may be based on solid-state single-mode or multimode light sources such as a light-emitting diode (LED), a superluminescent light-emitting diode (SLED), a side-emitting laser diode, a vertical-cavity surface-emitting laser diode (VCSEL), etc.

In some embodiments focusing optics 235, such as a lens or a lens system, may be configured to focus the image light 201 through the aperture 215. In operation, the light source 205 may provide the input image light 201 carrying image information. A controller 255 may be operably coupled to the light source 205 and SR 210. The controller 255 may be configured to provide driving signals 113 to SR 210, and control signals 111 to the light source 205 in coordination with operating SR 210. For example, the controller 255 may cause SR 210 to angularly scan the light beam 209 through a succession of directions in coordination with causing the light source 205 to change the optical power level of the image light 201, to form an image in angular domain. A feedback circuit may be provided to provide information about the current state or angular position of SR 210 by means of feedback signals 117 to the controller 255. The feedback signals 117 may include, for example, temporal sampling of the X and Y angular position, sync signals at specific pre-determined tilt angles, etc.

Figure 3:
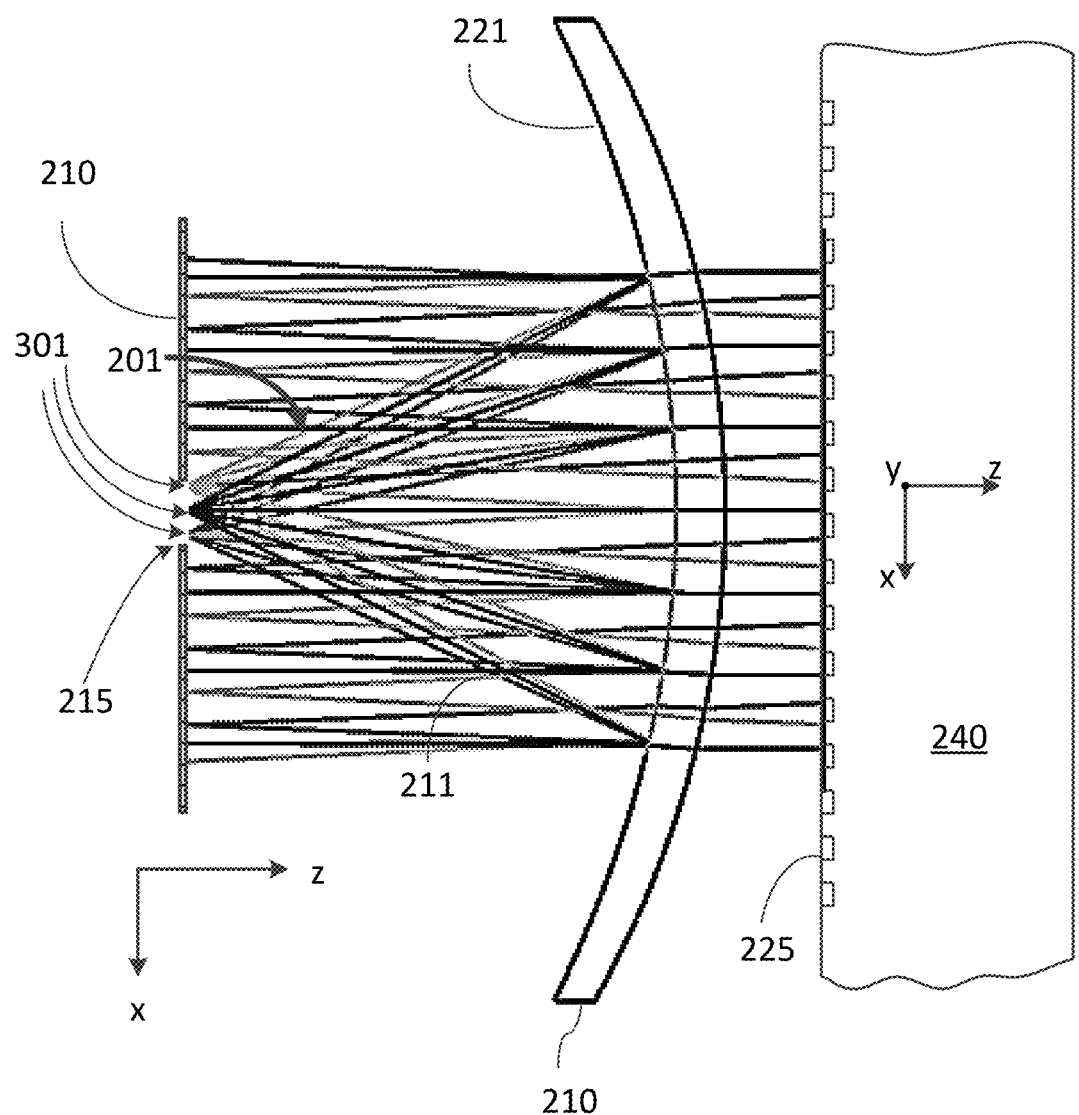
FIG. 3 is a schematic cross-sectional side view of a beam-scanning back end of the example display device of FIG. 2A operating with multiple input beams.

Referring to FIG. 3, in some embodiments image light 201 may include multiple input light beams 301, which may be of different colors or of a same color. In some embodiments at least some of the multiple input light beams 301, for example of different colors, may be focused to a same location within aperture 215. In some embodiments at least some of the multiple input light beams 301 may have beam waists (focal points) at different locations within aperture 215. Multiple light beams 301 from multiple emitters may be used, for example, to support different colors, or to provide enhanced image resolution in a projector display by using different emitters for different pixels or different groups of pixels.

Figure 4A:
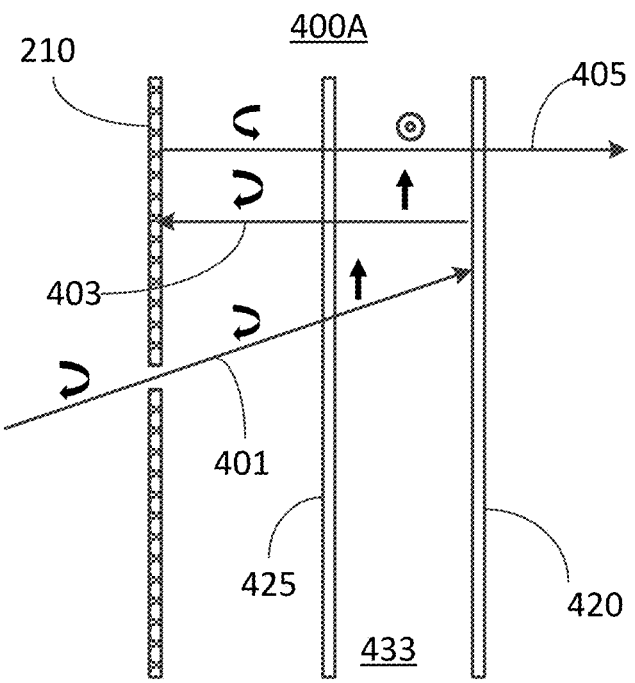
FIG. 4A is a schematic diagram of an example beam scanner including a polarizing back reflector and a QWP.
Figure 4B:
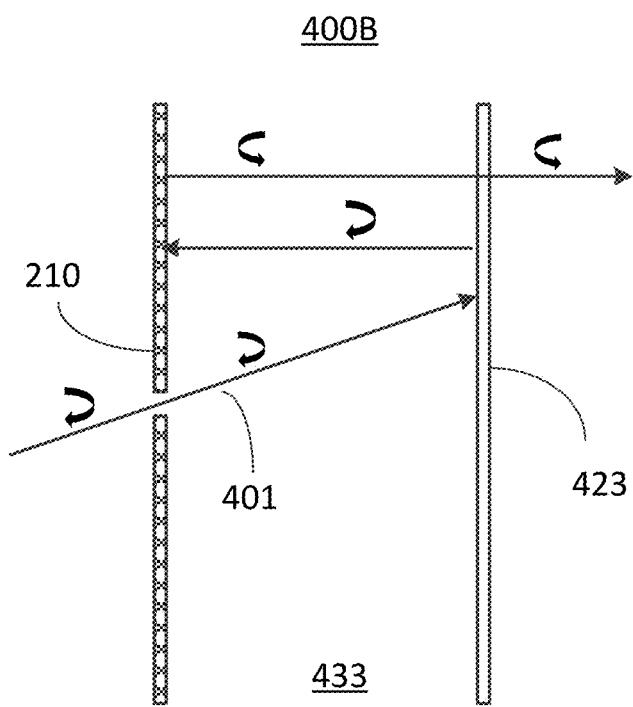
FIG. 4B is a schematic diagram of an example beam scanner including a circular-polarizing back reflector.

FIGS. 4A and 4B schematically illustrate embodiments in which SR 210 is coupled to a BR in a polarization-diversity configuration to form a triple-pass cavity 433. Referring first to FIG. 4A, a beam scanner 400A includes SR 210 that is coupled to a BR 420 embodied as a reflecting polarizer. In the illustrated example, BR 420 is a linear reflecting polarizer configured to reflect p-polarized light and transmit s-polarized light. BR 420 may represent BR 220 described above. Input light beam 401, which may represent input image light 201, is circularly-polarized, and a suitably oriented quarter-wave waveplate (QWP) 425 disposed in cavity 433 converts input light 401 into p-polarized light, which is reflected back by BR 420. The second passing through QWP 425 converts the p-polarized light back to the input circular polarization state. The reflection from SR 210 flips the input circular polarization to an orthogonal circular polarization. A third pass through QWP 425 converts the orthogonal circular polarization to the linear s-polarization, which is then transmitted through BR 420 to form an output scanned beam 405. In another embodiment BR 420 may be configured to reflect s-polarized light and transmit p-polarized light, with corresponding changes to the QWP orientation and the polarization of the input beam 401. The QWP 425 may be positioned anywhere between the SR 210 and the BR 420; in some embodiments it may be laminated upon a face of BR 420 facing SR 210, or upon SR 210 facing BR 420.

FIG. 4B schematically illustrates a beam scanner 400B including SR 210 that is coupled to a BR 423 including a cholesteric liquid crystal (ChLC) polarizer. A ChLC polarizer may be configured to reflect circular polarized light having the same helicity as the ChLC material, and to transmit circular polarized light of the opposite helicity. In the illustrated example, BR 423 is configured to reflect the circular polarization of the input light 401. The reflection from SR 210 flips the input circular polarization to the orthogonal circular polarization, which is then transmitted through BR 423. Thus, a QWP between the SR and BR is not required in the embodiment of FIG. 4B. Although in FIGS. 4A and 4B the BRs 420, 423 are shown schematically as flat, they may have concave reflective faces facing the SR 210 as described above.

Figure 4C:
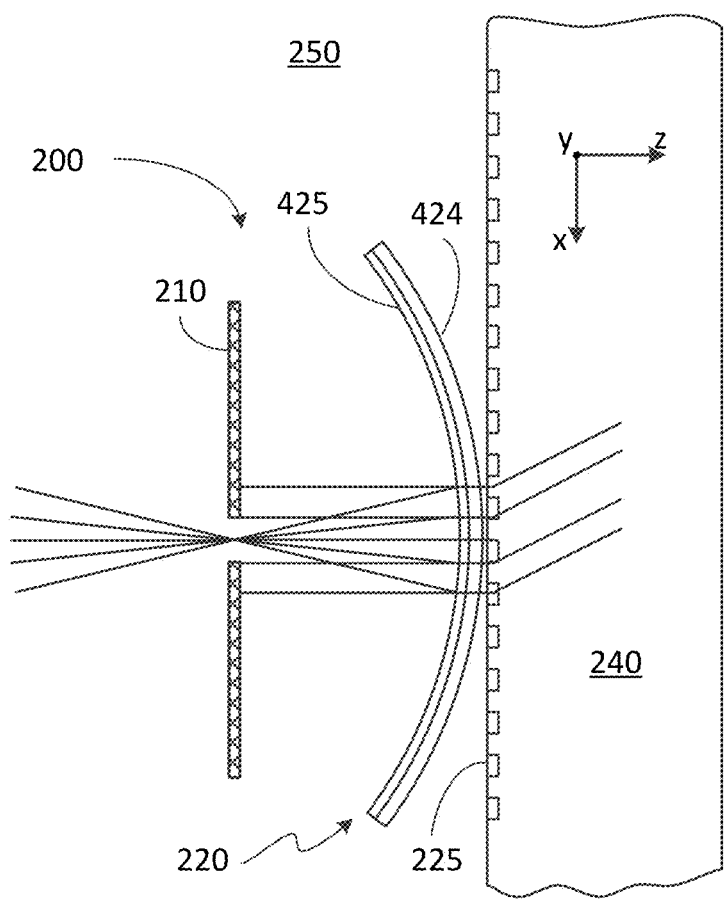
FIG. 4C is a schematic diagram of an example folded beam scanner including a concave circular-polarizing back reflector with a QWP at its reflecting face coupled to a relay waveguide of a display device.

FIG. 4C schematically illustrates an example embodiment in which scanner 200 includes a QWP 425 that is disposed at a concave reflecting face of a reflective linear polarizer 424 to form an embodiment of BR 220. QWP 425 may be for example laminated onto the reflecting face of the reflective linear polarizer 424 to form an integrated optical element.

Figure 4D:
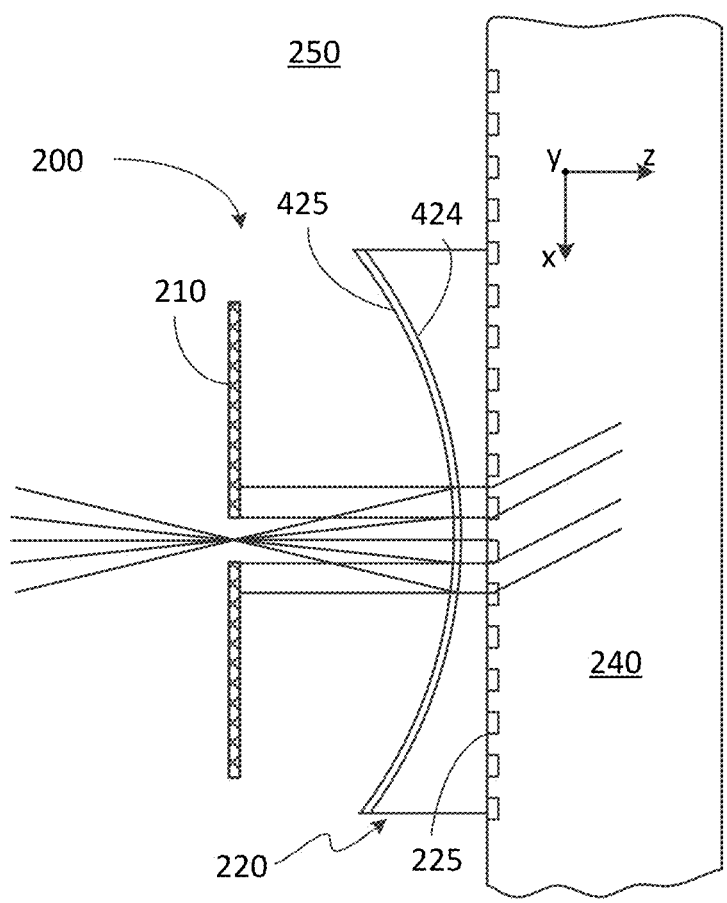
FIG. 4D is a schematic diagram of an embodiment of the display device of FIG. 4C with the back reflector having a flat face adjacent the relay waveguide.

FIG. 4D shows an example embodiment in which a face of BR 220 proximate to waveguide 240, which may be referred to as its front face, is flat. In some embodiment the front face of BR 220 may be in physical contact with waveguide 240. In some embodiment the flat front face of BR 220 may be parallel to waveguide 240. Although FIG. 4D shows a QWP 425 disposed at the reflecting face of BR 220, it may also be disposed elsewhere between SR 210 and BR 220, or may be absent, for example as described above with reference to FIG. 2B.

Figure 5:
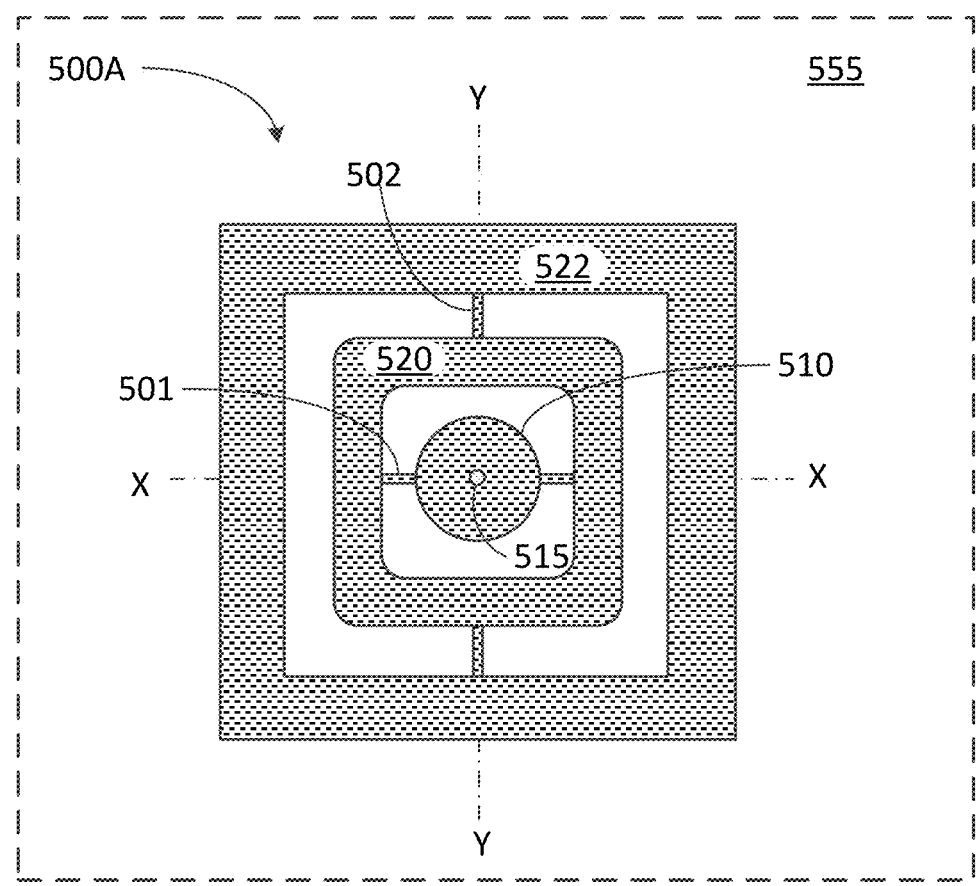
FIG. 5 is a plan view of a 2D scanning microelectromechanical system (MEMS) with a tilting reflector having an opening therein.

In any of the embodiments described above or below, SR 210 may be embodied using a MEMS tiltable reflector, such as for example a MEMS scanner 500 shown in FIG. 5 having a reflector 510 that may be tilted about two orthogonal axes. Reflector 510, e.g. a mirror or a diffraction grating, is supported by a pair of first torsional hinges 501 allowing tilting the reflector 510 about X axis. The first torsional hinges 501 extend from the reflector 510 to a gimbal ring 520, which is supported by a pair of second torsional hinges 502 extending from the gimbal ring 520 to a fixed base 521 or an optional second gimbal ring in-between, for tilting of the gimbal ring 520 and the reflector 510 about Y axis. The fixed base 522 may be supported by a substrate 555. Actuators may be disposed underneath the reflector 510 and/or the gimbal ring 520 for providing a force for actuating the tilt of the reflector 510 about X and Y axes. The actuators may be electrostatic, electro-magnetic, piezo-electric, etc. For electrostatic mirror actuation, the comb drive may be located on the torsional hinges. For example, one actuator (not shown) may be disposed under an edge of the reflector 510 to tilt the reflector 510 about X-axis, while another actuator (not shown) may be disposed under the gimbal ring 520 for tilting the gimbal ring 520 and the reflector 510 about Y-axis.

Reflector 510 may be used to implement SR 210 described above, and may have an aperture 515 to allow input light beam to be provided through the reflector 510. The aperture 515 may be for example, in the form of an opening or a hole in a middle portion of the reflector, so that reflector 510 has a doughnut-like shape ("doughnut MEMS mirror"). In at least some embodiments aperture 515 may be located in the center of the tilting reflector 510 at the intersection of the tilt axes, denoted X and Y in FIG. 5, so its location remains stationary during tilting. An off-center location of the aperture 515 is also within the scope of the present disclosure. Although aperture 515 is shown to have a circular shape, apertures of different shapes may be employed, including but not limited to square, rectangular, in the form of a slit, or generally any other shape as suitable in particular embodiments. By way of example, reflector 510 may be a circular mirror having a diameter of 1.5 mm, and aperture 515 may be a through-hole or opening of a diameter 0.005-0.2 mm. Other shapes and dimensions of reflector 510 and aperture 515 are also within the confines of the present disclosure. Although FIG. 5 illustrates a gimbaled reflector, gimbal-less tilting reflectors with an aperture or opening, including gimbal-less MEMS reflectors may also be used to implement SR 210. In some embodiments ring-shaped stiffening structures may be used at the back side of the tilting reflector 510.

Figure 6A:
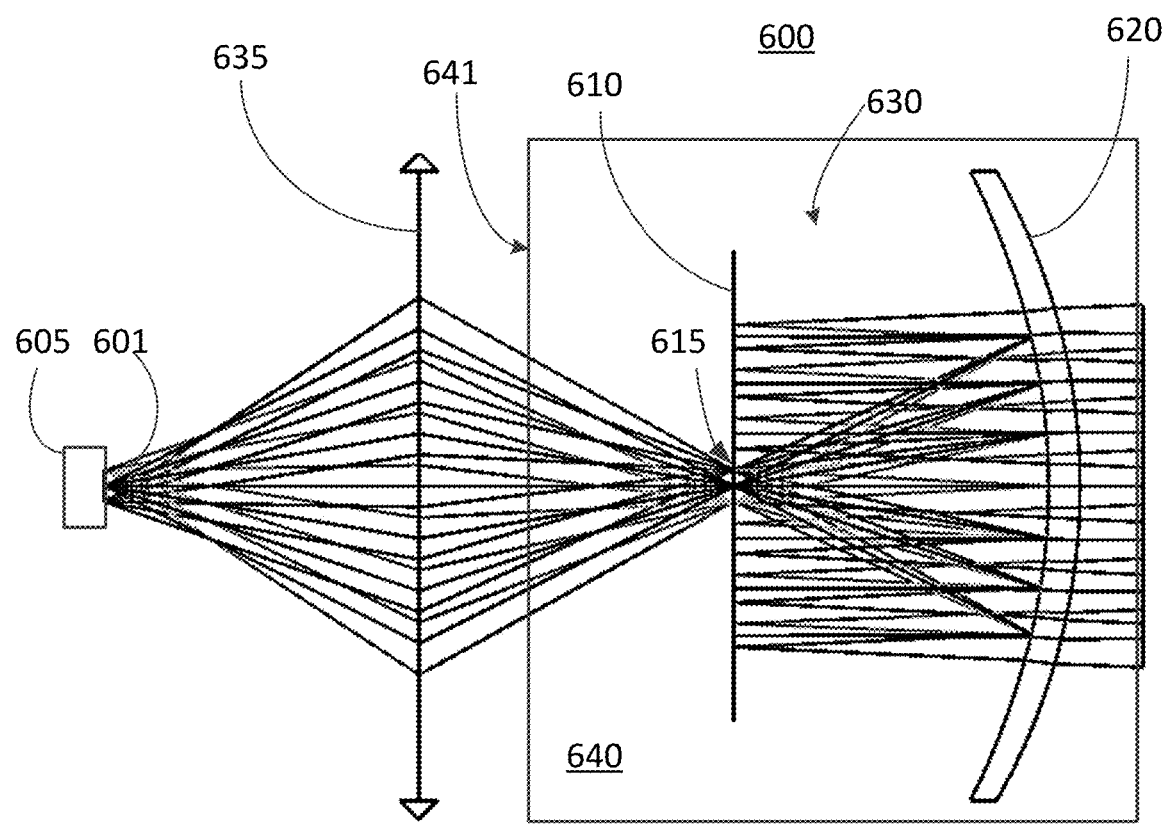
FIG. 6A is a schematic cross-sectional side view of a scanning projector including focusing optics upstream of a beam scanner.

FIG. 6A illustrates a scanning projector 600 that may be used in embodiments of the present disclosure to provide angularly scanned image light to a relay waveguide. Scanning projector 600 uses a beam scanner 630 that includes SR 610 coupled to BR 620, and focusing optics 635 configured to focus one or more input light beams 601 onto an aperture 615 of SR 610. The beam scanner 630 is generally as described above with reference to FIGS. 2A-4D. In some embodiments SR 610 may be a MEMS reflector, for example as described above with reference to FIG. 5. In some embodiments SR 610 may be supported by a MEMS housing 640, which may have an open or transparent back side 641. Although schematically shown as a single focusing lens, focusing optics 635 may include one or more lens elements, one or more reflectors, one or more gratings, one or more waveplates, one or more polarizers, and other optical elements or devices suitable to perform desired optical functions, which may include, but are not limited to, beam shaping, beam focusing, and beam pre-aberration. In some embodiments one or more elements of focusing optics 635 may be disposed outside of MEMS housing 640. In some embodiments one or more elements of focusing optics 635 may be disposed inside of MEMS housing 640.

Figure 6B:
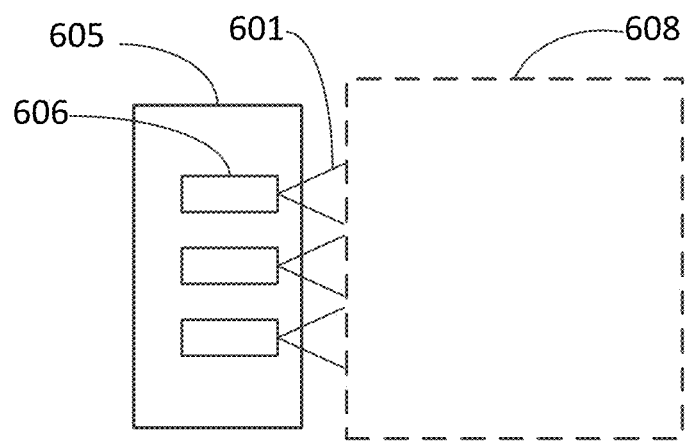
FIG. 6B is a schematic diagram of a multi-emitter light source for a scanning projector.

With reference to FIG. 6B, a scanning projector, such as projector 600 described above, may include a light source 605 comprising one or more emitters 606, such as laser diodes (LD), light emitting diodes (LED), super-luminescent light emitting diodes (SLED), or the like, which may be edge-emitting or surface-emitting. FIG. 6B shows, by way of example, three emitters 606 that provide three input beams, but various embodiments may include more emitters of fewer emitters. In some embodiments additional light processing optics 608 may be provided downstream of emitters 606, and may be configured to pre-condition, e.g. shape, polarize, and/or rout the input light beams 601 as desired.

Figure 7:
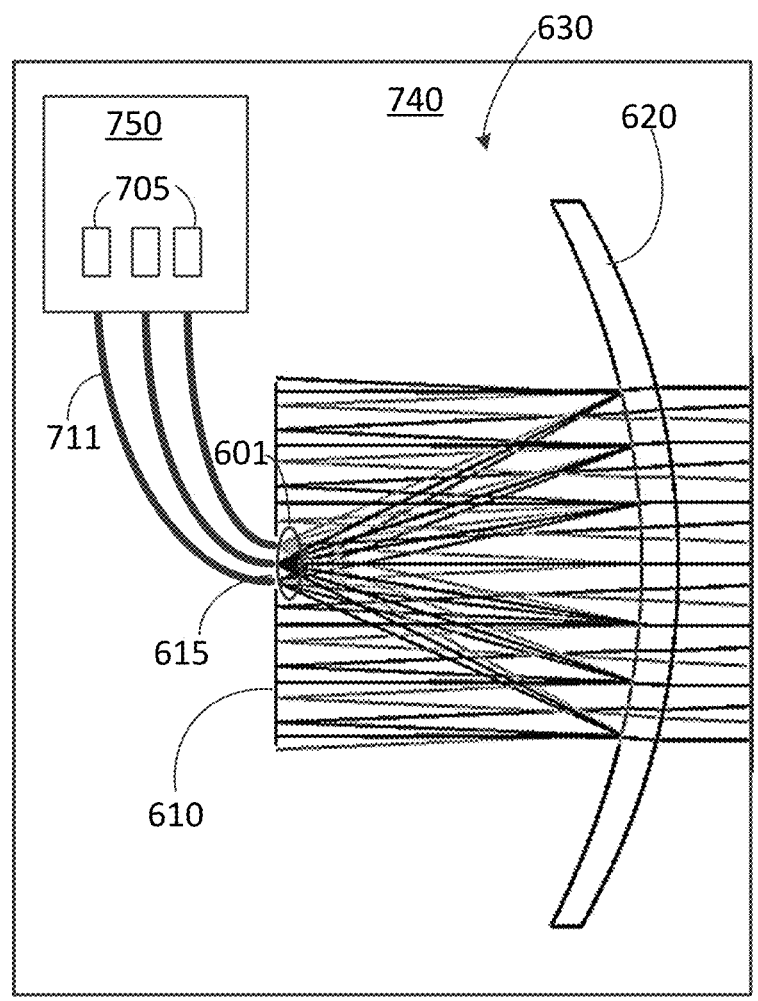
FIG. 7 is a schematic diagram of a scanning projector including the beam scanner of FIGS. 2,3 and upstream photonic integrated circuit (PIC) for providing one or more light beams to the beam scanner.

With reference to FIG. 7, in some embodiments a photonic integrated circuit (PIC) 750 may be used to provide input light 601. The input light 601 may be delivered to aperture 615 by one or more waveguides 711. In some embodiments SR 610 may be a MEMS reflector as described above, and PIC 750 and waveguide 711 may be included within a MEMS package 740 also housing the MEMS reflector, thereby reducing the overall size of the projector. In some embodiments PIC 750 and SR 610 may be supported by a same MEMS substrate. In some embodiments waveguides 711 may be planar optical waveguides supported by the MEMS substrate. In some embodiments PIC 750 may be in a separate chip. In some embodiments waveguides 711 may include one or more optical fibers. In some embodiments PIC 750 may include one or more emitters 705, such as for example one or more edge-emitting LDs or SLEDs or surface-emitting LDs or SLEDs. In some embodiments PIC 750 and/or waveguides 711 may include meta-gratings. In some embodiments, BR 620 may also be provided within the MEMS package 640. In some embodiments BR 620 may be comprised in a cover of the MEMS package, e.g. in a side thereof facing a relay waveguide.

Figure 8A:
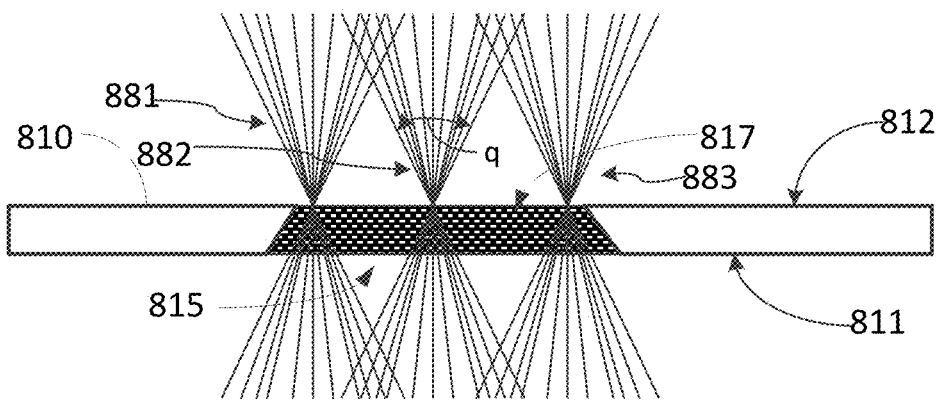
FIG. 8A is a schematic cross-sectional view of a tapered opening in a scanning reflector.
Figure 8B:
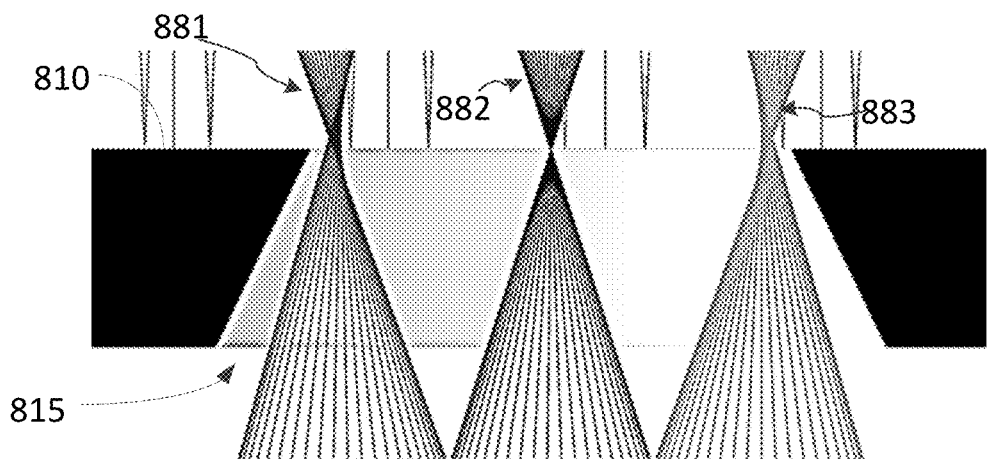
FIG. 8B is a schematic cross-sectional view of the tapered opening of FIG. 8A illustrating pre-aberration of off-center input beams.

Referring to FIGS. 8A and 8B, in some embodiments a scanning reflector 810, with a light input face 811 and a reflecting face 812 has an aperture 815 that may be in the form of a tapered opening or hole that widens toward the light input face 811 to reduce or eliminate beam clipping near the edges. In some embodiments, the scanning reflector 810 may be darkened at the edges 817 of the aperture to reduce reflections. The scanning reflector 810 may represent any of the scanning reflectors SR 210, 510, 610 described above. The taper angle may correspond to a convergence angle θ of the input beam, for example may be about θ/2. The taper angle may also depend on the scan angle range of the reflector. The tapering of the aperture 815 may be optimized to reduce or eliminate the possibility of clipping the input beams by the light input side 811 of the scanning reflector 810.

In some embodiments, for example where multiple input beams are used, such as beams 881, 882, 883 shown by way of example in FIGS. 8A and 8B, off-axis beams 881 and 883 may acquire more aberrations as they propagate through the system. For example, they may experience coma aberrations upon reflection from a curved, e.g. parabolic, BR (not shown), such as BR 220, 420, 423, 620 described above in embodiments where said back reflectors are parabolic. In some embodiments the edge beams 881, 883 may be pre-aberrated in such a way to pre-compensate for the aberrations downstream in the beam scanner. In some embodiments, focusing or relaying optics upstream of the beam scanner may be suitably configured to provide such pre-aberration and pre-compensation, which may be accomplished using approaches known in the art. In embodiments using PICs and waveguides to provide input beams through an SR window, suitably configured waveguides and meta-gratings may be used to pre-aberrate the beam wavefront.

FIGS. 9A-9D illustrate some example embodiments of focusing optics that may be used upstream of beam scanners in embodiments of the present disclosure. In some embodiments the scanning reflector 910 shown may be a tilting MEMS reflector. In some embodiments parts all or all of the focusing optics may be disposed inside a MEMS package. In some embodiments parts all or all of the focusing optics may be disposed outside of the MEMS package. In some embodiments the focusing optics may include elements, such as but not limited to cylindrical or biaxial lenses, configured to compensate for non-circular emitter aperture and to form input light beams circular in cross-section.

Figure 9A:
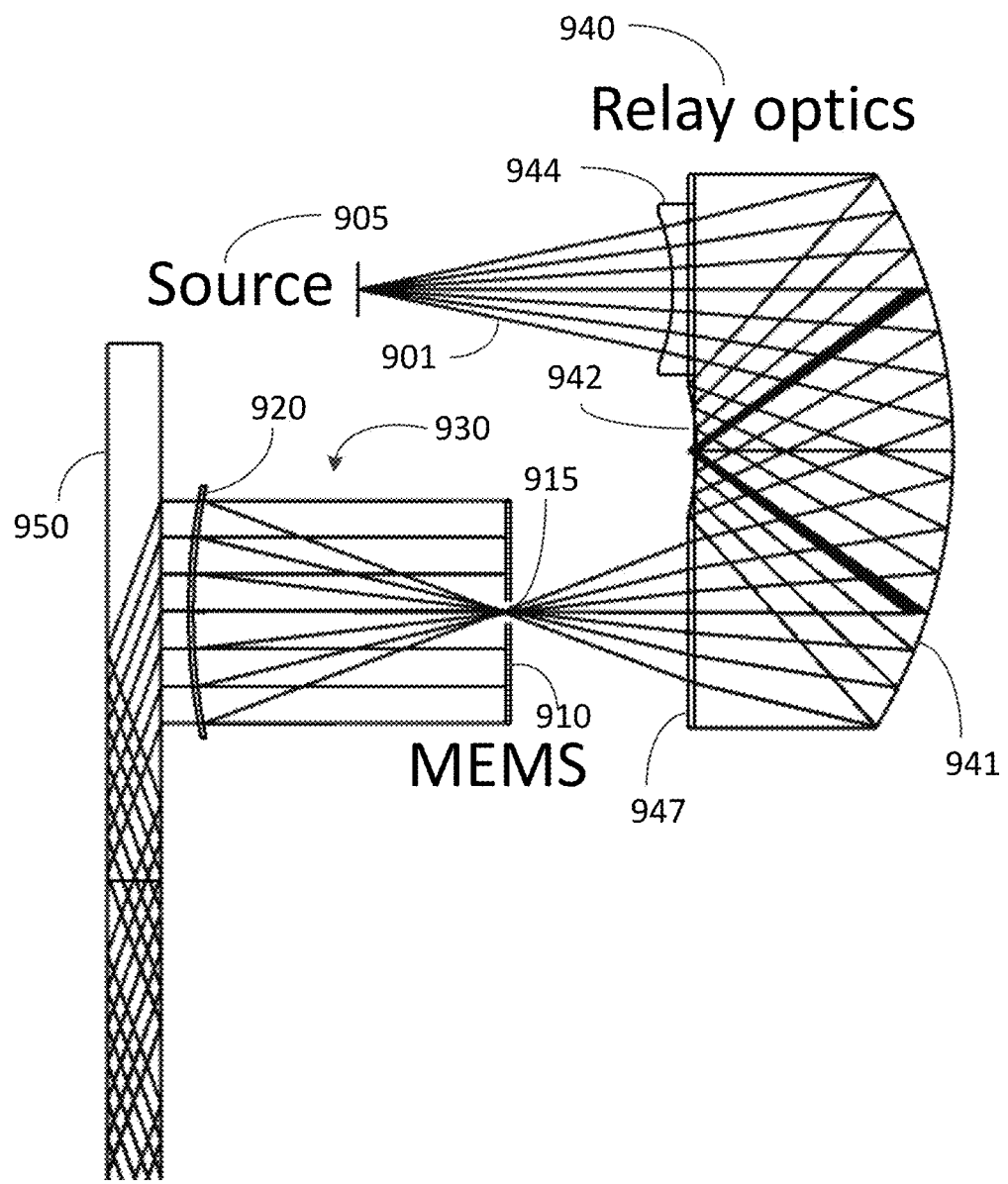
FIG. 9A is a schematic ray-traced view of a scanning projector display including a beam scanner of FIG. 2 and example relay optics relaying input light to the beam scanner according to an embodiment.

FIG. 9A illustrates an example projector display in which a beam scanner 930 directs a scanning light beam into a relay waveguide 950. The beam scanner 930 includes BR 920 coupled to SR 910 having an aperture 915, and may be as described above. Relay optics 940 may be configured to focus input light beam 901 emitted by a point light source 905 onto a location within the SR aperture 915 or through the SR aperture 915. In the illustrated embodiment relay optics 940 includes a first reflective surface 941, which may be concave for focusing the input light beam, and a second reflective surface 942, which may be flat, concave, or convex. The second reflective surface 942 is configured to bounce light reflected from the first reflective surface 941 back toward the first reflective surface 941 for a second reflection therefrom toward the SR aperture 915. The relay optics 940 may further include one or more lens elements 944 at the input and/or output thereof. A polarization element 947, such as a circular polarizer or a waveplate, e.g. a QWP, may be included to provide a desired polarization of the image light into the aperture, for example a circular polarization.

Figure 9B:
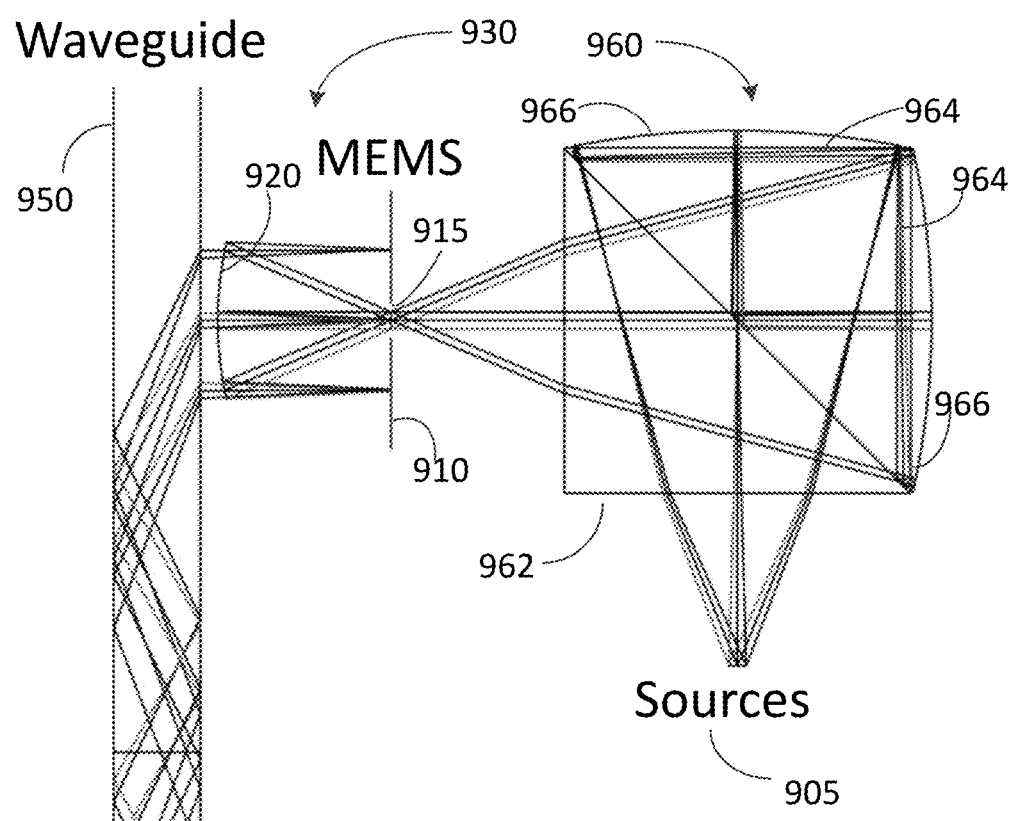
FIG. 9B is a schematic ray-traced view of a scanning projector display including a beam scanner of FIG. 2 and example beam-folding optics relaying input light to the beam scanner.

FIG. 9B illustrates an example projector display using folded relay optics 960 to direct light from one or more point light sources 905 to the SR aperture 915 of the beam scanner 930. The folded relay optics 960 may include a polarization beam splitting (PBS) cube 962 configured in a multi-pass configuration, receiving one or more divergent light beams from the light source 905 through an input face, and outputting one or more focused light beams through an output face at 90 degrees to the input direction. The folded relay optics 960 may include convex reflectors 966 disposed at adjacent faces of the PBS cube 962 opposing the input and output faces, and may further include QWPs 964 for converting the polarization of light reflected from the convex reflectors 966 to an orthogonal polarization. The convex reflectors 966 may be configured for focusing the input light beam onto a location within the SR aperture 915 or through the SR aperture 915. The relay optics 940 may further include one or more lens elements 944 at the input and/or output thereof. One or both of the convex reflectors 966 may be replaced with a focusing or collimating lens followed by a flat reflector. In some embodiments one or more focusing or collimating lenses may be provided at the input and/or output of the PBS cube 962.

Figure 9C:
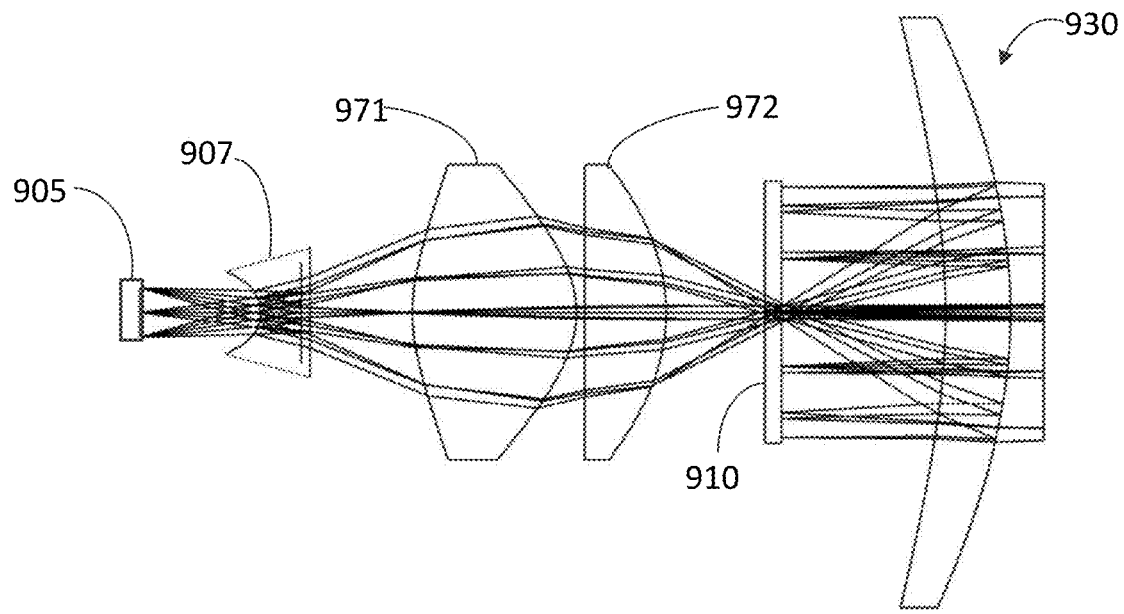
FIG. 9C is a schematic ray-traced view of a scanning projector including an example beam scanner of this disclosure coupled to dual-lens focusing optics.
Figure 9D:
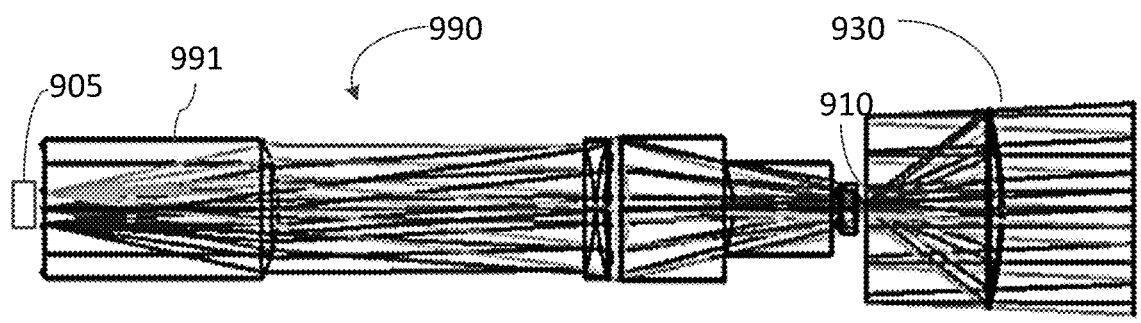
FIG. 9D is a schematic ray-traced view of a scanning projector including an example beam scanner of this disclosure and upstream narrow-barrel focusing optics.

FIGS. 9C and 9D illustrate two other examples of focusing optics that may be used upstream of a beam scanner of the present disclosure. The focusing optics of FIG. 9C includes a collimating lens 971 followed by a focusing lens 972. The light source or sources 905 is followed by beam shaping optics 907, which may be configured to correct for the anamorphism of the light sources 905 and to make the input beam(s) circular in cross-section. The focusing optics 990 of FIG. 9D has a narrow barrel lens design, which can be easier fitted inside AR glasses. It includes beam shaping and focusing optics 991 followed by a sequence of lens elements which co-operate to focus image light from light sources 905 into the aperture of SR 910.

The example beams scanning arrangements of the present disclosure may have the advantage of reducing the gap between a MEMS reflector and an input grating coupler of a relay waveguide in scanning projector displays, allowing to reduce the size of the input grating coupler and to reduce optical losses. Furthermore, all or at least some elements of the scanning projector of the present disclosure, such as optical emitters, beam shaping and beam focusing optics upstream of the beam scanner, the MEMS reflector, and the back reflector may be arranged within a same package with a small footprint. Furthermore the beam shaping and beam focusing optics may be provided in a PIC, which further reduces the size of the projector. The PIC may be disposed in a same chip with the MEMS reflector or in a different chip. In embodiments where the scanning beam projector is disposed on the eye-side of a NED, the protrusion on the world-side may be negligible or non-existent.

Figure 10:
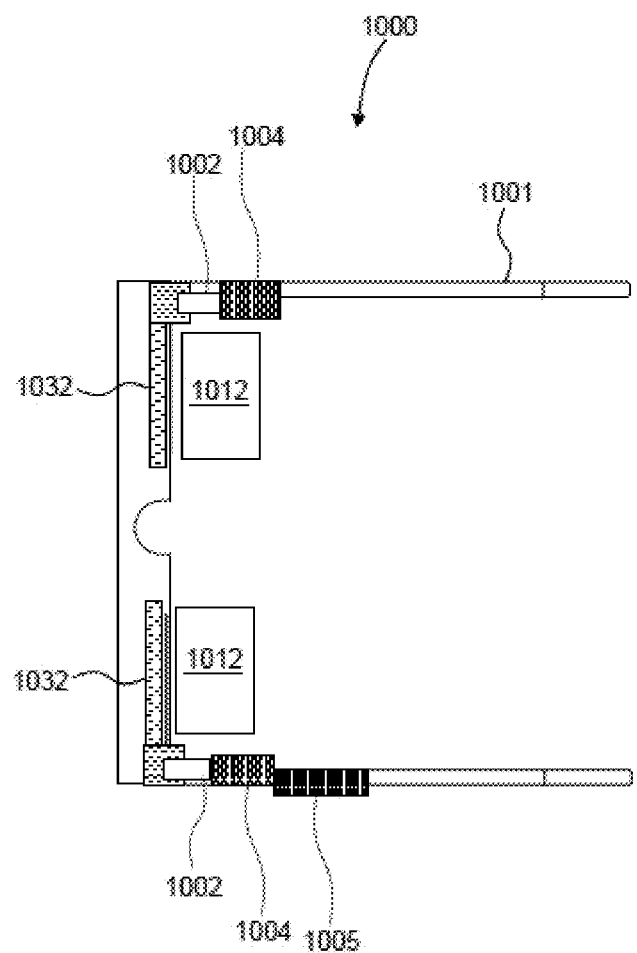
FIG. 10 is a plan cross-sectional view of a near-eye display including a beam scanner of this disclosure.

Referring to FIG. 10, a near-eye display (NED) 1000 includes a frame 1001 having a form factor of a pair of eyeglasses. The frame 1001 may support, for each eye: a projector 1002 for providing display light carrying an image in angular domain, an electronic driver 1004 operably coupled to the projector 1002 for powering the projector 1002, and a pupil replicating waveguide 1032 optically coupled to the projector 1002.

Each projector 1002 may include beam scanners and light sources described herein. The beam scanners 200, 400A, 400B, 630, 930 described above with reference to FIGS. 2A-9D may be used in the projectors 1002. Light sources for these projectors may include a substrate supporting one or more single-mode or multimode semiconductor light sources. For example, the light sources or emitters 605, 705, 905 described above may include one or more side-emitting laser diodes, vertical-cavity surface-emitting laser diodes, SLEDs, or light-emitting diodes, for providing one or more light beams as described above. Collimators and/or focusing optics for the light sources may include concave mirrors, bulk lenses, Fresnel lenses, holographic lenses, pancake lenses, etc. The focusing optics may inject input light beams through a window or aperture in a scanning reflector. The pupil replicators 1032 may include waveguide(s) equipped with a plurality of surface relief and/or volume holographic gratings. The pupil replicators 1032 may provide multiple laterally offset copies of the display light beams provided by the projectors 1002 at respective eyeboxes 1012.

A controller 1005 is operably coupled to the light sources and scanning reflectors of the projectors 1002. The controller 1005 may be configured to determine the X- and Y-tilt angles of the scanning reflectors of the projectors 1002. The controller 1005 determines which pixel or pixels of the image to be displayed correspond to the determined X- and Y-tilt angles. Then, the controller 1005 determines the brightness and/or color of these pixels, and operates the electronic drivers 1004 accordingly for providing powering electric pulses to the light sources of the projectors 1002 to produce light pulses at power level(s) corresponding to the determined pixel brightness and color.

In some embodiments, the controller 1005 may be configured to operate, for each eye, scanning reflector(s) to cause the light beam reflected from the scanning reflectors and propagated through the respective folded beam scanner to have a beam angle corresponding to a pixel of an image to be displayed. The controller 1005 may be further configured to operate the corresponding light source in coordination with operating the scanning reflectors, such that the light beam has brightness and/or color corresponding to the pixel being displayed. In multi-light source/multi-emitter embodiments, the controller 1005 may be configured to operate the corresponding light sources/emitters in coordination, to provide a larger FOV, an improved scanning resolution, increased brightness of the display, etc. For example, in embodiment where the projectors for both of user's eyes each include two light sources, the controller 1005 may be configured to operate the scanning reflectors to cause two light beams reflected from the scanning reflectors and propagated through the folded beam scanner to have beam angle corresponding to respective two pixels of an image to be displayed, and operate the light sources in coordination with operating the scanning reflectors, such that the two light beams have brightness and/or color corresponding to the two respective pixels. More light sources than two may be provided, each light source including one or a plurality of emitters, for one or a plurality of color channels of the image being displayed.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11A:
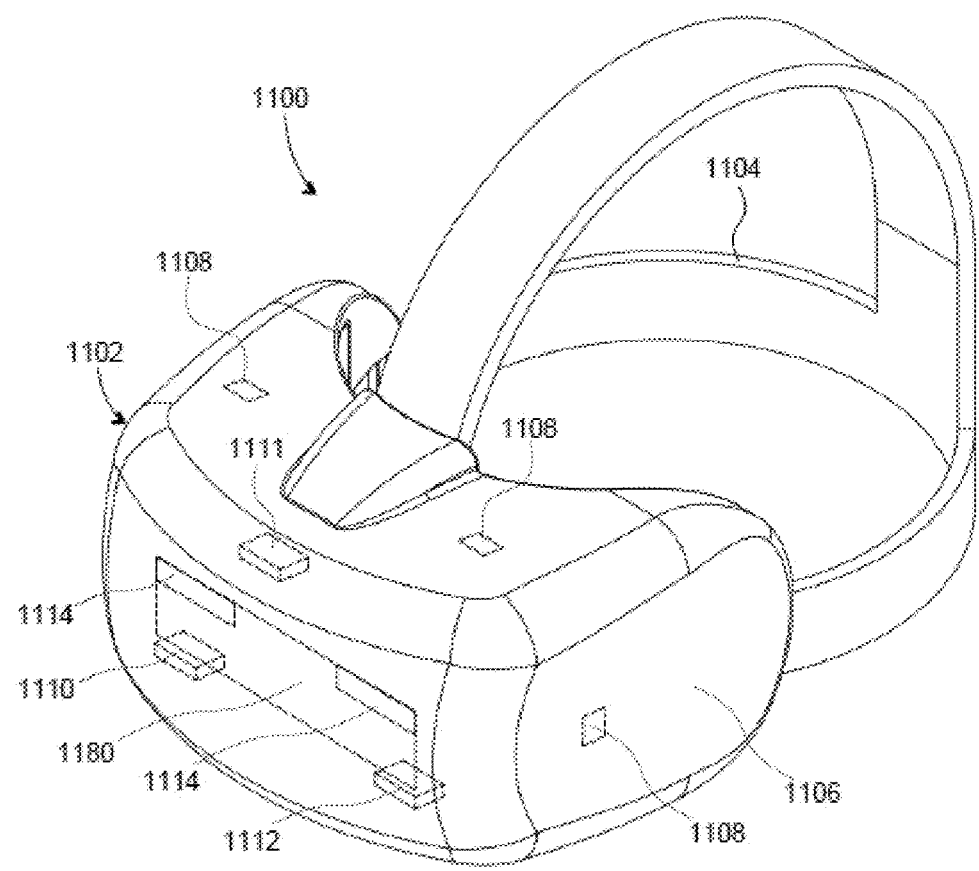
FIG. 11A is an isometric view of a head-mounted display of the present disclosure.

Referring to FIG. 11A, an HMD 1100 is an example of an AR/VR wearable display system which encloses the user's face, for a greater degree of immersion into the AR/VR environment. The HMD 1100 may include one of the beams scanners and scanning projectors described above with reference to FIGS. 2-9B. The function of the HMD 1100 is to augment views of a physical, real-world environment with computer-generated imagery, and/or to generate the entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head.

A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 11B:
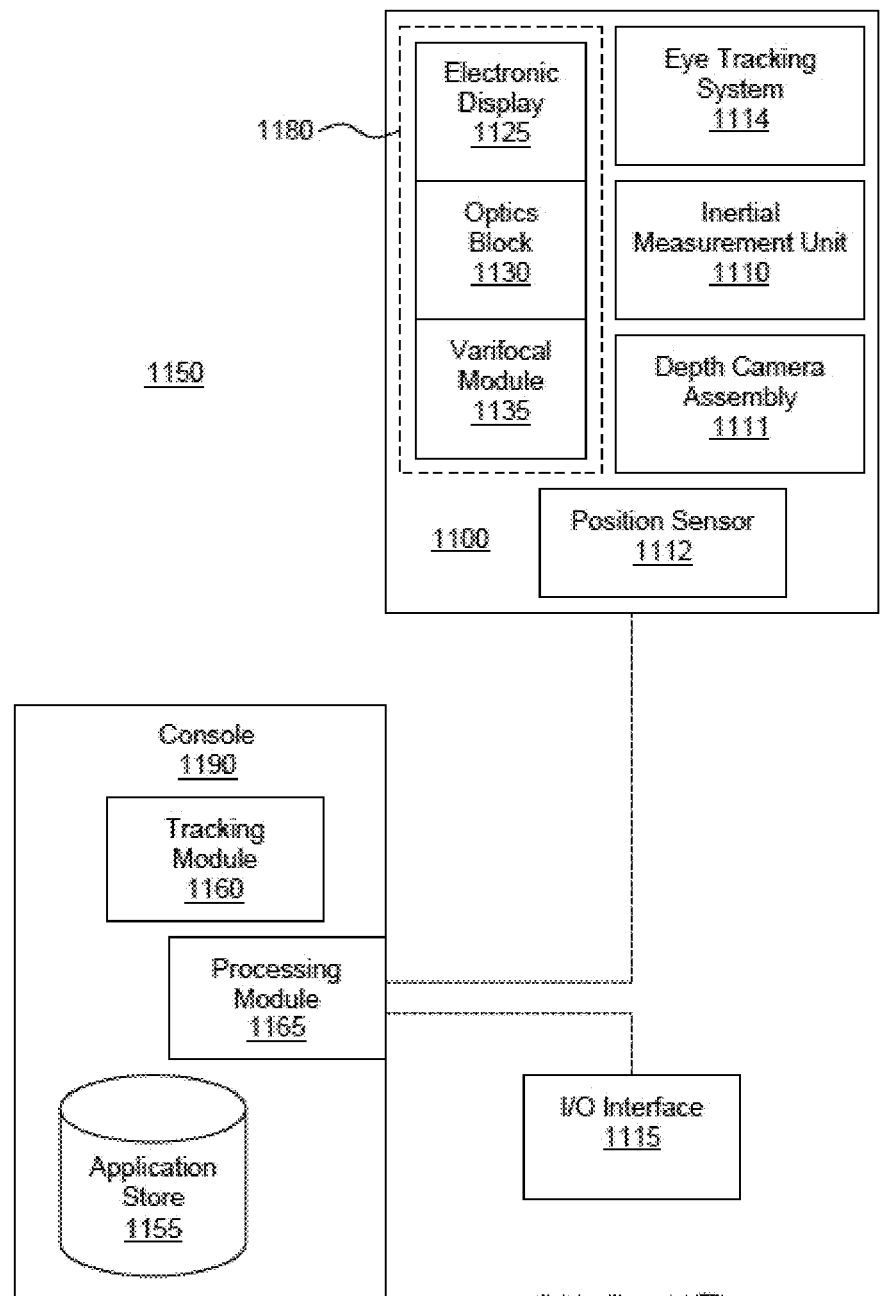
FIG. 11B is a block diagram of a virtual reality system including the headset of FIG. 11A.

Referring to FIG. 11B, an AR/VR system 1150 is an example implementation of a near-eye display using a beams scanner as described above. The AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11A and 11B may be distributed among the components in a different manner than described in conjunction with FIGS. 11A and 11B in some embodiments. For example, some or all of the functionality of the console 1190 may be provided by the HMD 1100, and vice versa. The HMD 1100 may be provided with a processing module capable of achieving such functionality.

As described above with reference to FIG. 11A, the HMD 1100 may include the eye tracking system 1114 (FIG. 11B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 may include (FIG. 11B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a scanning projector, or a combination thereof. The display system 1180 may further include an optics block 1130, whose function may be to shape image light for the scanning projector, and/or to convey the image light to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 11B, the console 1190 includes an application store 1155, a tracking module 1160, and a processing module 1165. Some embodiments of the console 1190 may have different modules or components than those described in conjunction with FIG. 11B. Similarly, the functions further described below may be distributed among components of the console 1190 in a different manner than described in conjunction with FIGS. 11A and 11B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may re-calibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze. The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Furthermore, elements or features described with reference to a particular embodiment may be used in other embodiments. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device comprising:
a pupil replicating waveguide comprising an input coupler; and,
a beam scanner configured to angularly scan image light for coupling into the pupil replicating waveguide, the beam scanner comprising:
a scanning reflector, and
a second reflector disposed between the scanning reflector and the input coupler;
wherein the scanning reflector has an aperture for the image light to propagate therethrough toward the second reflector; and,
wherein the second reflector is configured to reflect at least a portion of the image light received through the aperture back toward the scanning reflector and to transmit at least a portion of the image light reflected from the scanning reflector toward the input coupler.

2. The display device of claim 1 wherein the second reflector is configured to at least partially collimate the image light reflected therefrom.

3. The display device of claim 2 wherein the second reflector comprises a curved reflective surface.

4. The display device of claim 2 wherein the second reflector comprises a reflective polarizer.

5. The display device of claim 4 comprising a quarter-wave plate (QWP) disposed between the reflective polarizer and the scanning reflector.

6. The display device of claim 1 further comprising a light source configured to emit the image light.

7. The display device of claim 6 wherein the light source comprises a plurality of emitters for emitting the image light comprising a plurality of image light beams.

8. The display device of claim 1 comprising focusing optics configured to focus the image light through the aperture.

9. The display device of claim 1 wherein the aperture is in a center of the scanning reflector.

10. The display device of claim 1 wherein the aperture has tapered edges.

11. The display device of claim 1 wherein the aperture has a rectangular shape.

12. The display device of claim 1 comprising a photonic integrated circuit (PIC) configured to direct the image light into the aperture.

13. The display device of claim 1 wherein the scanning reflector comprises a tiltable mirror.

14. The display device of claim 1 wherein the scanning reflector comprises a MEMS reflector.

15. The display device of claim 14 comprising a substrate supporting the MEMS reflector, and a photonic integrated circuit (PIC) supported by the substrate and configured to direct the image light into the aperture.

16. The display device of claim 1 comprising aberration correcting optics upstream of the scanning reflector and configured to pre-compensate for aberrations related to off-axis light propagation.

17. The display device of claim 1 comprising at least one of relay optics upstream of the scanning reflector or folded optics upstream of the scanning reflector.

18. A method for coupling an image light beam from a scanning reflector into a pupil replicating waveguide of a scanning display, the method comprising:
directing a divergent light beam through an aperture in the scanning reflector toward a second reflector disposed between the scanning reflector and an input coupler of the pupil replicating waveguide to obtain a reflected light beam propagating back toward the scanning reflector;
reflecting the reflected light beam by the scanning reflector for at least partially transmitting through the second reflector as the image light beam; and
operating the scanning reflector to angularly scan the reflected light beam.

19. The method of claim 18 wherein the second reflector is configured to reflect incident light of a first polarization and to transmit incident light of a second polarization, the method comprising changing a polarization state of the reflected light beam from the first polarization at a first incidence upon the second reflector to the second polarization at a second incidence upon the second reflector.

20. A display device comprising:
a pupil replicating waveguide having an input pupil; and,
a beam scanner configured to scan image light across the input pupil, the beam scanner comprising:
a scanning reflector comprising an aperture for allowing the image light to pass through the scanning reflector; and,
a second reflector disposed between the scanning reflector and the input pupil, the second reflector configured to reflect at least a portion of the image light received from the aperture toward the scanning reflector, and to transmit at least a portion of the image light reflected from the scanning reflector toward the input pupil.

* * * * *